(12) United States Patent
Nakamoto et al.

(10) Patent No.: US 11,972,394 B2
(45) Date of Patent: Apr. 30, 2024

(54) SHELF INVENTORY MANAGEMENT SYSTEM, SHELF INVENTORY MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Yoshiaki Nakamoto, Nisshin (JP); Yuta Itozawa, Nagoya (JP); Hirotaka Komura, Tokyo (JP); Yutaro Takagi, Tokyo (JP); Junya Ota, Tokyo (JP); Kunihiro Iwamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/552,569

(22) Filed: Dec. 16, 2021

(65) Prior Publication Data

US 2022/0270030 A1 Aug. 25, 2022

(30) Foreign Application Priority Data

Feb. 19, 2021 (JP) .................................. 2021-025028

(51) Int. Cl.
*G06Q 10/087* (2023.01)
(52) U.S. Cl.
CPC ................. *G06Q 10/087* (2013.01)

(58) Field of Classification Search
CPC ....... G06Q 10/087; B65G 1/04; B65G 1/1373
See application file for complete search history.

(56) References Cited

U.S. PATENT DOCUMENTS

| | | | |
|---|---|---|---|
| 2002/0027507 A1* | 3/2002 | Yarin | ..................... G16H 20/13 |
| | | | 705/2 |
| 2018/0000692 A1* | 1/2018 | Born | ..................... A61J 7/0084 |
| 2018/0075216 A1* | 3/2018 | Nurse | ..................... E05B 45/00 |

FOREIGN PATENT DOCUMENTS

| CN | 102295131 A | | 12/2011 | |
|---|---|---|---|---|
| CN | 102473173 A | * | 5/2012 | ............. G06F 17/00 |
| JP | 2007094655 A | | 4/2007 | |
| JP | 2015513728 A | | 5/2015 | |
| JP | 2019197584 A | | 11/2019 | |
| WO | 2013123422 A2 | | 8/2013 | |

\* cited by examiner

*Primary Examiner* — A. Hunter Wilder
(74) *Attorney, Agent, or Firm* — Dickinson Wright, PLLC

(57) ABSTRACT

A shelf inventory management system includes: a shelf installed in a house; a sensor that detects that an article is taken out from the shelf; a management unit that manages an inventory status of the article stored in the shelf, based on a detection result of the sensor; and a terminal for notifying a user of information related to the article stored in the shelf. The management unit stores, for each user, a taken out amount of each health-related product a consumption amount of which affects health, of the article stored in the shelf, and is able to output the taken out amount of each health-related product to the terminal.

8 Claims, 3 Drawing Sheets

SHELF INVENTORY MANAGEMENT SYSTEM, SHELF INVENTORY MANAGEMENT METHOD, AND NON-TRANSITORY STORAGE MEDIUM

CROSS-REFERENCE TO RELATED APPLICATION

This application claims priority to Japanese Patent Application No. 2021-025028 filed on Feb. 19, 2021, incorporated herein by reference in its entirety.

BACKGROUND

1. Technical Field

The present disclosure relates to a shelf inventory management system, a shelf inventory management method, and a program.

2. Description of Related Art

Japanese Unexamined Patent Application Publication No. 2019-197584 (JP 2019-197584 A) discloses a health management support system that acquires and records health management information input or reported by a user and outputs a message related to health management to the user based on the health management information.

SUMMARY

To convert the domestic consumption amount of articles such as foods, beverages, cigarettes, supplements, medicines, the consumption amount of which affects health (referred to as health-related products) into data for health management, the person needs to input the data himself/herself, and there has been an issue that this is time-consuming.

The present disclosure has been made in view of such circumstances, and provides a shelf inventory management system that allows easy grasping of the consumption amount of health-related products.

A shelf inventory management system according to an aspect of the present disclosure includes: a shelf installed in a house; a sensor that detects that an article is taken out from the shelf; a management unit that manages an inventory status of the article stored in the shelf, based on a detection result of the sensor; and a terminal for notifying a user of information related to the article stored in the shelf. The management unit stores, for each user, a taken out amount of each health-related product a consumption amount of which affects health, of the article stored in the shelf, and is able to output the taken out amount of each health-related product to the terminal.

A shelf inventory management method according to another aspect of the present disclosure is a shelf inventory management method for detecting by a sensor that an article stored in a shelf installed in a house is taken out from the shelf, and managing an inventory of the article stored in the shelf by using a computer based on a detection result of the sensor. The shelf inventory management method includes: storing, for each user, a taken out amount of each health-related product a consumption amount of which affects health, of the article stored in the shelf; and outputting the taken out amount of each health-related product to a terminal for notifying a user of information related to the article stored in the shelf.

A program according to another aspect of the present disclosure is a program for detecting by a sensor that an article stored in a shelf installed in a house is taken out from the shelf, and managing an inventory of the article stored in the shelf by using a computer based on a detection result of the sensor. The program stores, for each user, a taken out amount of each health-related product a consumption amount of which affects health, of the article stored in the shelf. The program outputs the taken out amount of each health-related product to a terminal for notifying a user of information related to the article stored in the shelf.

In the aspect of the present disclosure, for each user, the taken out amount of each health-related product the consumption amount of which affects health, of the article stored in the shelf, is stored, and the taken out amount of each health-related product is output to the terminal for notifying a user of information related to the article stored in the shelf Therefore, each user can easily grasp the consumption amount of the health-related product and can use the data for health management.

When the user takes out the health-related product and the taken out amount of the health-related product in a predetermined period exceeds a reference amount for health management, the management unit may output to the terminal attention calling information for calling attention to health management. With such a configuration, excessive intake of health-related products that may be harmful to health due to excessive intake, for example, can be suppressed.

When the user takes out the health-related product, the management unit may output to the terminal question information inquiring about a person who actually consumes the health-related product that has been taken out. With such a configuration, it is possible to match the taken out amount and the consumption amount of the health-related product for the user.

The shelf may include a plurality of storage boxes each of which is identified. The sensor may include a first sensor provided for each row of the shelf to detect a mass change of the storage boxes, and a second sensor that detects that each of the storage boxes is pulled out from the shelf. With such a configuration, it is possible to determine the article taken out, based on the mass change of the storage boxes.

The shelf may be provided with a lock mechanism for locking each of the storage boxes, and each of the storage boxes may be locked while the article is stored and unlocked when the article is taken in and out. The second sensor may detect that each of the storage boxes has been unlocked. With such a configuration, it is possible to easily detect that each of the storage boxes is pulled out from the shelf.

The present disclosure can provide a shelf inventory management system that allows easy grasping of the consumption amount of health-related products.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments will be described in detail with reference to the drawings. In each drawing, the same or corresponding elements are designated by the same reference signs, and duplicate descriptions are omitted as necessary for the sake of clarity.

First Embodiment

Configuration of Shelf Inventory Management System

Figure 1:
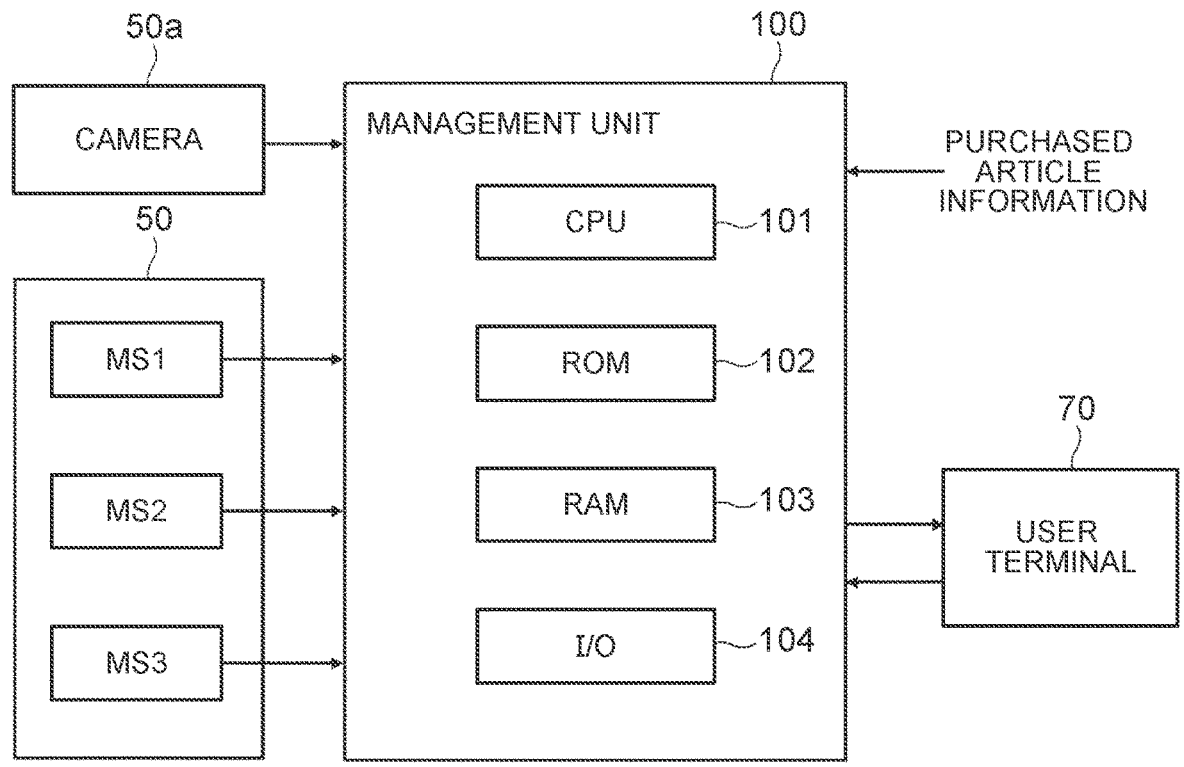
FIG. 1 is a block diagram of a shelf inventory management system according to a first embodiment.

First, a shelf inventory management system according to a first embodiment will be described with reference to FIG. 1. FIG. 1 is a block diagram of the shelf inventory management system according to the first embodiment. The shelf inventory management system is a system that manages the inventory of consumables stored in each of a plurality of storage boxes accommodated in a shelf, by using a computer. As shown in FIG. 1, the shelf inventory management system according to the present embodiment includes a shelf 50, a camera 50a, a user terminal 70, and a management unit 100.

Figure 2:
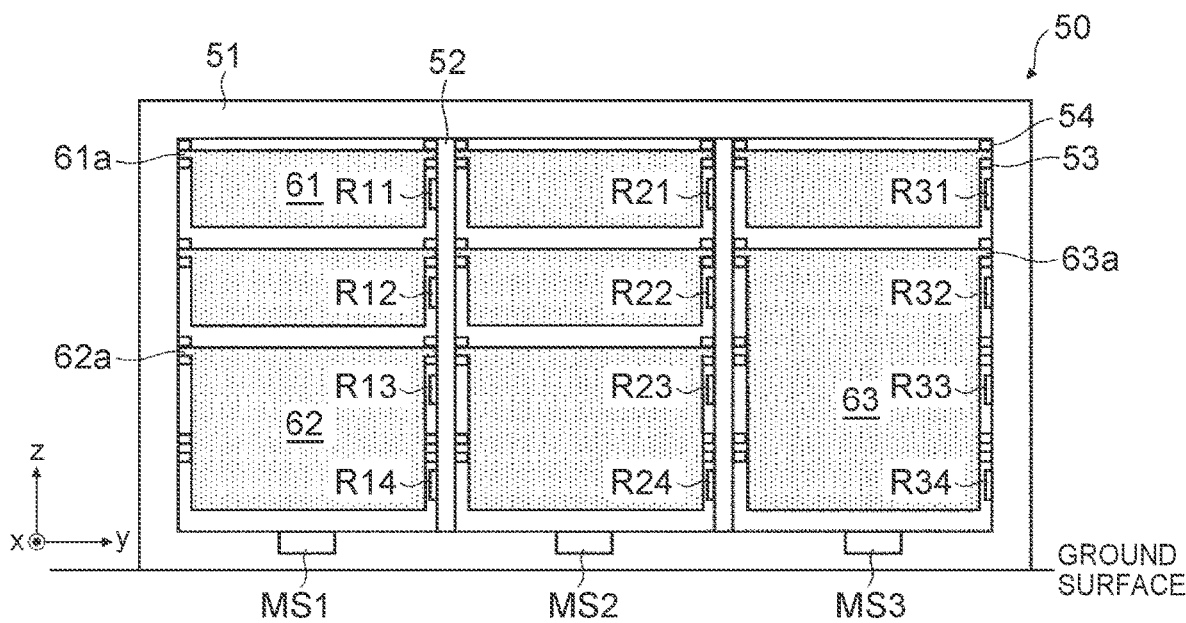
FIG. 2 is a schematic front view showing an example of a configuration of a shelf 50.

The shelf 50 is a shelf for storing the consumables, and is installed in, for example, a living space of a house. In this specification, the house includes an apartment house, an office building, and the like, and the living space includes an office space. Here, FIG. 2 is a schematic front view showing an example of a configuration of the shelf 50. As shown in FIG. 2, the shelf 50 includes storage boxes 61 to 63 for storing the consumables. Further, as shown in FIGS. 1 and 2, the shelf 50 includes mass sensors MS1 to MS3 for detecting the consumables taken out from the storage boxes 61 to 63. The details of the shelf 50 will be described later with reference to FIG. 2.

The camera 50a is a camera that monitors the shelf 50. The camera 50a is provided, for example, on the shelf 50 itself or around the shelf 50. As shown in FIG. 1, an image acquired by the camera 50a is transmitted to the management unit 100. Based on the image acquired by the camera 50a, the management unit 100 can determine the user who has taken out the consumables from the shelf 50.

As shown in FIG. 1, the user terminal 70 is a terminal for notifying the user of information and the like related to the consumables stored in the shelf 50. The user terminal 70 is not limited as long as the user terminal 70 has a function as a computer, and is, for example, a mobile communication terminal such as a smartphone or a tablet terminal, a personal computer (PC), or the like. The user terminal 70 may be a separate terminal for each user or a terminal common to all users. The user terminal 70 includes a display unit capable of displaying various types of information.

Although not shown, the user terminal 70 includes, for example, a calculation unit such as a central processing unit (CPU) and a storage unit such as a random access memory (RAM) and a read only memory (ROM) in which various control programs, data, and the like are stored. That is, the user terminal 70 has a function as a computer, and performs various processes based on the above-mentioned various control programs and the like.

The management unit 100 is a computer that manages the inventory of the consumables stored in each of the storage boxes 61 to 63 on the shelf 50. The management unit 100 is, for example, a server such as a cloud server, and is provided separately from the shelf 50 and the user terminal 70. The management unit 100 is not limited to a server as long as the management unit 100 has a function as a computer, and may be, for example, a mobile communication terminal such as a smartphone or a tablet terminal, a personal computer (PC), or the like. The management unit 100 may be provided integrally with the shelf 50, or may be provided integrally with the user terminal 70.

As shown in FIG. 1, the management unit 100 is wirelessly or wiredly connected to the shelf 50, the camera 50a, and the user terminal 70 so as to be able to communicate with each other. The management unit 100 includes a CPU 101, a ROM 102, a RAM 103, and an input/output (I/O) 104 as hardware. That is, the management unit 100 has a function as a computer, and performs various processes based on the above-mentioned various control programs and the like.

The CPU 101 is, for example, an arithmetic unit that performs control processing, arithmetic processing, and the like. The ROM 102 is, for example, a storage unit that stores a control program, an arithmetic program, and the like executed by the CPU 101. The RAM 103 is a storage unit that temporarily stores processed data and the like. In the RAM 103, for example, identification information (for example, the name of the consumable, that is, the trade name) and the mass of each consumable stored in each of the storage boxes 61 to 63 on the shelf 50 are stored. The RAM 103 stores a taken out amount of each health-related product stored in the shelf 50 for each registered user. The I/O 104 is an input/output device that inputs data and signals from the outside and outputs the data and signals to the outside.

As described above, the management unit 100 stores inventory information such as the identification information and the mass of each consumable stored in each storage box 61 to 63 on the shelf 50. The management unit 100 determines which consumable was taken out from which of the storage boxes 61 to 63, and updates the inventory information of the storage boxes 61 to 63 from which the consumable has been taken out.

Specifically, as shown in FIG. 1, the management unit 100 determines the consumables taken out from the shelf 50, based on the mass change that is the detection result of the mass sensors MS1 to MS3 provided for each row of the shelf 50. Further, the management unit 100 determines from which of the storage boxes 61 to 63 the consumables were taken out based on the fact that any of the storage boxes 61 to 63 accommodated in the row for which the mass change is recognized is pulled out from the shelf 50.

On the other hand, as shown in FIG. 1, the management unit 100 manages the consumables stored in each of the storage boxes 61 to 63 on the shelf 50, based on purchased article information, and updates the inventory information. In this way, the management unit 100 manages the inventory of each of the storage boxes 61 to 63 on the shelf 50. The purchased article information is information related to the purchased consumable, includes at least the identification information and the mass of each purchased consumable, and is associated with each consumable. That is, the purchased article information is information that serves as the source of the inventory information when the consumable is stored in any of the storage boxes 61 to 63.

Further, the management unit 100 stores the taken out amount of each health-related product stored in the shelf 50 for each registered user, and outputs the taken out amount of each health-related product to the user terminal 70. Therefore, each user can easily grasp the consumption amount of the health-related product and can use the data for health management. A user who uses the shelf 50 is registered in advance in the management unit 100. The management unit 100 may also store the taken out date and time in addition to the taken out amount for each health-related product. It is possible to more accurately grasp the consumption tendency of health-related products for each user. The user can, for example, present such data to a doctor for advice.

Here, a health-related product is a consumable, the consumption amount of which affects health. Foods, beverages, cigarettes, supplements, medicines, etc. can be listed as health-related products. The taken out amount may be managed for all health-related products, or for example, the taken out amount may be selectively managed for alcoholic beverages, cigarettes, confectionery, etc., which may be harmful to health due to excessive intake.

The method by which the management unit 100 recognizes the user who has taken out the health-related product from the shelf 50 is not limited in any way. For example, when each user takes out consumables (including health-related products) from the shelf 50, the management unit 100 determines the user who has taken out the consumables from the shelf 50 based on the image of the user acquired by the camera 50a. Alternatively, the shelf 50 may be equipped with a biometric authentication device. Alternatively, when each user takes out the consumables from the shelf 50, each user may notify the management unit 100 via the user terminal 70.

Further, when the user takes out the health-related product and the taken out amount of the health-related product in a predetermined period exceeds the reference amount for health management, the management unit 100 may output to the user terminal 70 attention calling information for calling attention to health management. The reference amount for health management is set for each health-related product, for example.

The attention calling information is, for example, information for urging the person to refrain from consuming the health-related product taken out or to switch to other health-related products. With such a configuration, it is possible to suppress excessive intake of alcoholic beverages, cigarettes, confectionery, etc., which may be harmful to health due to excessive intake, for example.

Further, the management unit 100 may automatically order the consumables when the inventory amount of the consumables falls below a predetermined reference value. Here, for the health-related product with the taken out amount exceeding the above-mentioned reference amount, the management unit 100 may suspend the automatic ordering of the health-related product for a predetermined period. The management unit 100 may also store the health diagnosis result of each user and change the reference amount and the attention calling information for each user based on the health diagnosis result.

If the health-related product taken out by the user is not consumed by the user himself/herself, the taken out amount and the consumption amount will not match. Therefore, when the user takes out the health-related product, the management unit 100 may output to the user terminal 70 question information inquiring about the person who actually consumes the taken-out health-related product.

For example, when the health-related product taken out by the user A is consumed by another user B registered in the management unit 100, the health-related product is added as the taken out amount for the other user B instead of the user A. When a person who is not registered in the management unit 100 consumes the health-related product taken out by the user A, the health-related product is simply not added as the taken out amount for the user A. With such a configuration, the taken out amount of the health-related product for the user A stored in the management unit 100 can be matched with the actual amount consumed by the user A.

As described above, in the shelf inventory management system according to the present embodiment, the management unit 100 stores the taken out amount of each health-related product stored in the shelf 50 for each user, and outputs the taken out amount of each health-related product to the user terminal 70. Therefore, each user can easily grasp the consumption amount of the health-related product and can use the data for health management.

Further, when the user takes out the health-related product and the taken out amount of the health-related product in a predetermined period exceeds the reference amount for health management, the management unit 100 outputs to the user terminal 70 the attention calling information for calling attention to health management. This can suppress excessive intake of health-related products that may be harmful to health due to excessive intake, for example.

Configuration of Shelf 50

Here, details of the configuration of the shelf 50 will be described with reference to FIG. 2. As shown in FIG. 2, the shelf 50 includes a housing 51, partition plates 52, rails 53, lock mechanisms 54, the mass sensors MS1 to MS3, readers R11 to R14, R21 to R24, R31 to R34, and the storage boxes 61 to 63.

The right-handed xyz orthogonal coordinates shown in FIG. 2 are indicated for convenience to describe the positional relationship of the components. Generally, the z-axis positive direction is vertically upward, and the xy plane is a horizontal plane. FIG. 2 is a front view, and the storage boxes 61 to 63 are hatched for easy understanding. Further, the configuration of the shelf 50 shown in FIG. 2 is merely an example, and the configuration of the shelf 50 is not limited as long as the shelf 50 includes a plurality of storage boxes that is each identified.

The housing 51 constitutes the outer frame of the shelf 50. In the example shown in FIG. 2, the housing 51 has a frame structure in which a top plate provided on a side in the z-axis positive direction, a bottom plate provided on a side in the z-axis negative direction, side surface plates provided on a side in the y-axis positive direction and on a side in the y-axis negative direction are integrally formed. That is, the front and back surfaces of the housing 51 are open so that the storage boxes 61 to 63 can be taken in and out. Doors that can be opened and closed may be provided on the front and back surfaces of the open housing 51. Further, the front surface or the back surface of the housing 51 may be closed.

As shown in FIG. 2, the partition plates 52 are provided so as to be parallel to the side surface plates constituting the housing 51 (that is, parallel to the xz plane), and extend from the front surface to the back surface of the open housing 51. Here, the partition plates 52 are provided so that the distance between the side surface plates of the housing 51 and the adjacent partition plates 52 and the distance between the partition plates 52 are equal. In the example of FIG. 2, two partition plates 52 are provided, and three rows of the accommodation location for the storage boxes 61 to 63 are provided, but the number of partition plates 52 is not limited at all. Further, the configuration may be such that the partition plate 52 is not provided and one row of the accommodation location for the storage boxes 61 to 63 is provided.

As shown in FIG. 2, a plurality of pairs of the rails 53 is provided so as to extend in a depth direction (x-axis direction) and each of the rails 53 is arranged at equal intervals in a height direction (z-axis direction) on the inner surfaces of the side surface plates of the housing 51 and the partition plates 52. Here, the rails 53 are provided so as to rise substantially perpendicularly from the inner surfaces of the side surface plates of the housing 51 and the partition plates 52. In the example of FIG. 2, four pairs of the rails 53 are provided in each row, and four storage boxes 61 having the smallest size can be accommodated in each row.

As a matter of course, the number of the rails 53 is not limited at all. Further, the rails 53 may discontinuously extend in the depth direction (x-axis direction) as long as the rails 53 can support the storage boxes 61 to 63. Alternatively, instead of the rails 53, short supports may be arranged so as to be aligned in the depth direction (x-axis direction).

As shown in FIG. 2, the storage boxes 61 to 63 can be taken in and out by sliding protruding portions 61*a* to 63*a* on a pair of the rails 53 that faces adjacent to each other. The protruding portions 61*a* to 63*a* protrude outward from the storage boxes 61 to 63 in a width direction. In this way, the shelf 50 can accommodate all of the storage boxes 61 to 63 of a predetermined plurality of sizes, while supporting the storage boxes 61 to 63 so that the storage boxes 61 to 63 are slidable along each pair of the rails 53.

The lock mechanism 54 is provided on the upper side of each pair of the rails 53. The lock mechanism 54 locks the storage boxes 61 to 63 accommodated in the shelf 50 and their lids (not shown) to the housing 51, and thus can prevent the storage boxes 61 to 63 and the consumables stored inside the storage boxes 61 to 63 from being stolen. Details of the rails 53 and the lock mechanism 54 will be described later.

In the present embodiment, the storage boxes 61 to 63 of the predetermined plurality of sizes have the same width in the y-axis direction and the same depth in the x-axis direction. However, the storage boxes 61 to 63 have different heights in the z-axis direction. The height of the storage box 61 having the smallest size is designed so as to match the distance between the adjacent rails 53 in the z-axis direction. As a matter of course, the height of the storage box 61 having the smallest size is smaller than the distance between the rails 53 described above. The height of the storage box 62 having the intermediate size is designed to be about twice the height of the storage box 61. The height of the storage box 63 having the largest size is designed to be about three times the height of the storage box 61.

That is, the heights of the storage boxes 61 to 63 of the predetermined plurality of sizes are designed to be approximately an integral multiple of the distance between the adjacent rails 53 in the z-axis direction. In the example shown in FIG. 2, there are three types of sizes of the storage box, but two types or four or more types may be used. In the example of FIG. 2, in addition to the storage boxes 61 to 63, for example, a storage box having a height of about four times the height of the storage box 61 may be separately provided.

Consumables (not shown) such as groceries and daily necessities are stored inside the storage boxes 61 to 63. For example, when the consumables stored in the storage boxes 61 to 63 are taken out, the consumables are newly replenished.

Here, each storage box 61 to 63 is identified by the identification information such as characters, symbols, barcodes, two-dimensional codes, radio frequency identifiers (RFID), etc. that can be read by the readers R11 to R14, R21 to R24, and R31 to R34, for example. Therefore, the management unit 100 shown in FIG. 1 can manage the inventory status of the consumables for each of the storage boxes 61 to 63 on the shelf 50. The identification information is directly attached to or embedded in each of the storage boxes 61 to 63. In the example shown in FIG. 2, the identification information (not shown) is provided to the side surfaces of the storage boxes 61 to 63 in the y-axis positive direction.

In the row on the side in the y-axis negative direction of the shelf 50 shown in FIG. 2, four readers R11 to R14 are provided on the partition plate 52 below each pair of the rails 53. In the central row, four readers R21 to R24 are provided on the partition plate 52 below each pair of the rails 53. In the row on the side in the y-axis positive direction, four readers R31 to R34 are provided on the side surface plate of the housing 51 below each pair of the rails 53.

By reading the identification information of the storage boxes 61 to 63 with the readers R11 to R14, R21 to R24, and R31 to R34, the storage boxes 61 to 63 accommodated in the shelf 50 can be identified and the accommodation location can be detected. Here, the identification information may include the sizes of the storage boxes 61 to 63. It should be noted that the readers R11 to R14, R21 to R24, and R31 to R34 are not essential.

Further, in the shelf inventory management system according to the present embodiment, the consumables taken out are determined based on the mass change of each storage box 61 to 63. Therefore, as shown in FIG. 2, the shelf 50 is provided with the mass sensors (first sensor) MS1 to MS3 for each row. The mass sensors MS1 to MS3 may be installed at each storage location (for example, for each pair of the rails 53) so that the mass changes of the individual storage boxes 61 to 63 can be measured. However, as shown in FIG. 2, providing the mass sensor for each row can reduce the number of mass sensors.

Further, the shelf 50 does not necessarily have to be provided with the mass sensors, and the mass sensors may be provided separately from the shelf 50. When taking out the consumables from the storage boxes 61 to 63, for example, the storage boxes 61 to 63 may be placed on a mass sensor provided separately from the shelf 50 to measure the mass change of the storage boxes 61 to 63.

In the example of FIG. 2, when the consumables stored in either the two storage boxes 61 or the one storage box 62 accommodated in the row on the side in the y-axis negative direction are taken out, the mass detected by the mass sensor MS1 changes. When the consumables stored in either the two storage boxes 61 or the one storage box 62 accommodated in the central row are taken out, the mass detected by the mass sensor MS2 changes. When the consumables stored in either the one storage box 61 or the one storage box 63 accommodated in the row on the side in the y-axis positive direction are taken out, the mass detected by the mass sensor MS3 changes.

The mass change detected by the mass sensors MS1 to MS3 is the mass of the consumables taken out. The storage box 61 to 63 from which the consumables were taken out can be determined by detecting that the storage box 61 to 63 accommodated in the row in which the mass change is recognized is pulled out from the shelf 50. The fact that the storage boxes 61 to 63 is pulled out from the shelf 50 can be easily determined, for example, by detecting that the lock mechanism 54, which will be described later, has been released. It goes without saying that the above may be detected by the readers R11 to R14, R21 to R24, and R31 to R34, the camera 50a shown in FIG. 1, or other sensors.

As described above, the management unit 100 stores the identification information, masses, and the like of the consumables stored in the storage boxes 61 to 63. Therefore, the management unit 100 can determine the consumables taken out from the shelf 50 based on the mass change detected by the mass sensors MS1 to MS3. Further, the management unit 100 can determine from which of the storage boxes 61 to 63 the consumables were taken out by detecting that the lock mechanism 54, which will be described later, has been released.

Details of Rail 53 and Lock Mechanism 54

Figure 3:
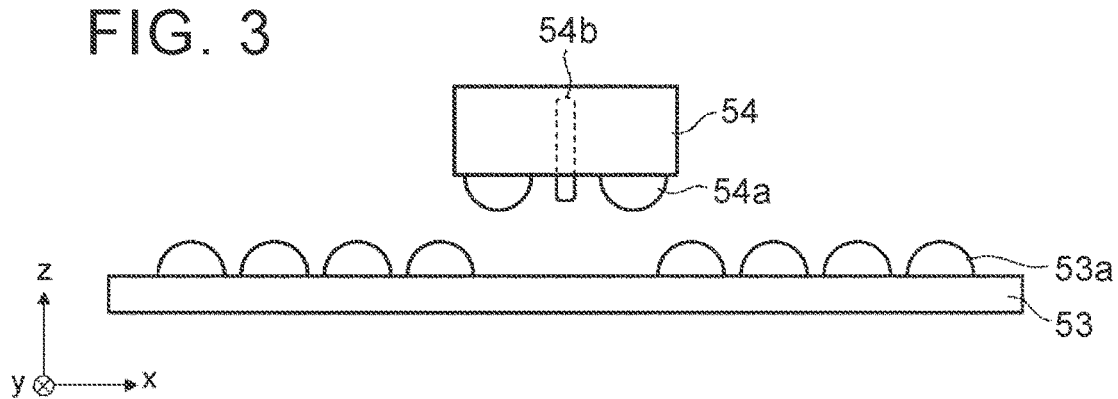
FIG. 3 is a schematic side view showing a rail 53 and a lock mechanism 54.
Figure 4:
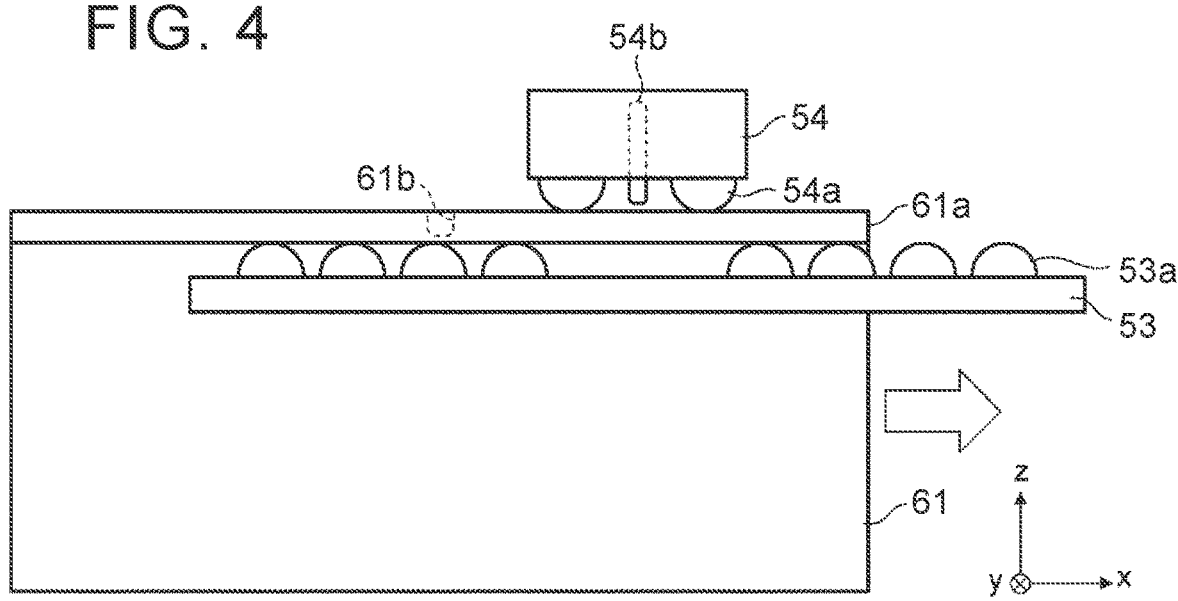
FIG. 4 is a schematic side view showing the rail 53 and the lock mechanism 54.
Figure 5:
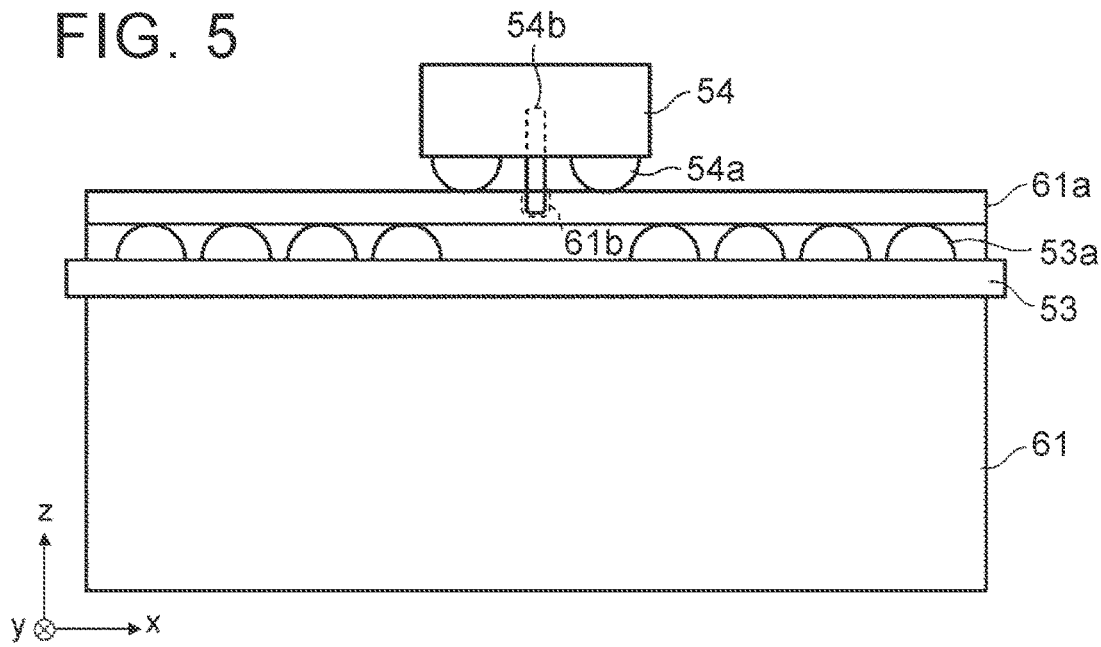
FIG. 5 is a schematic side view showing the rail 53 and the lock mechanism 54.

Here, the details of the rail 53 and the lock mechanism 54 will be described with reference to FIGS. 3 to 5. FIGS. 3 to 5 are schematic side views showing the rail 53 and the lock mechanism 54. FIGS. 3 to 5 show the positional relationship between the rail 53, the lock mechanism 54, and the storage box 61 as seen from the side in the y-axis negative direction in FIG. 2. The same applies to the positional relationship between the rail 53, the lock mechanism 54, and the storage box 62.

As shown in FIG. 3, the rail 53 is a roller rail and includes rollers 53a. The rollers 53a are made of, for example, plastic. The rollers 53a can reduce the friction coefficient between the protruding portion 61a of the storage box 61 and the rail 53, and can suppress the generation of abrasion powder due to the sliding of the protruding portion 61a.

The lock mechanism 54 shown in FIG. 3 is a solenoid lock and includes rollers 54a and a pin 54b. The lock mechanism 54 is provided so as to face each rail 53. As shown in FIGS. 4 and 5, the lock mechanism 54 is provided so as to slide with the protruding portion 61a of the storage box 61, and the rollers 54a are provided on the surface of the lock mechanism 54 that slides with the protruding portion 61a. The rollers 54a are made of, for example, plastic. The rollers 54a can reduce the friction coefficient between the protruding portion 61a of the storage box 61 and the lock mechanism 54, and can suppress the generation of abrasion powder due to the sliding of the protruding portion 61a.

As shown in FIG. 4, the lock mechanism 54 is released while the storage box 61 slides on the rail 53. Therefore, the pin 54b is retracted upward. On the other hand, as shown in FIG. 5, when the storage box 61 stops at a predetermined position on the rail 53, the lock mechanism 54 operates.

Specifically, the pin 54b advances downward and fits into a recess 61b provided in the protruding portion 61a of the storage box 61, whereby the storage box 61 is fixed to the housing 51 and the lid (not shown) of the storage box 61 is locked. As a matter of course, when the lock mechanism 54 is released, the storage box 61 can be moved again as shown in FIG. 4.

The lock mechanism 54 can prevent the storage box 61 and the consumables stored in the storage box 61 from being stolen. Further, the management unit 100 shown in FIG. 1 detects that the storage box 61 is locked. As a result, the management unit 100 can determine the rails 53 where the storage boxes 61 to 63 is accommodated. The storage box 61 is locked while the storage box 61 is accommodated in the shelf 50.

On the other hand, when taking out the consumables from the storage boxes 61 to 63, the management unit 100 shown in FIG. 1 detects that the locks of the storage boxes 61 to 63 have been released. That is, the management unit 100 detects that the storage box 61 to 63 has been pulled out from the shelf 50 (second sensor). As a result, the management unit 100 determines that the consumables have been taken out from the storage box 61 to 63 that has been pulled out.

The lock mechanism 54 is not limited to the solenoid lock, and may be any mechanism that can restrict the operation of the storage box 61 and lock the lid (not shown) of the storage box 61. For example, the pin 54b may operate mechanically. Alternatively, a rotary lock mechanism that does not use the pin 54b may be used. Further, the lock for the operation of the storage box 61 and the lock for the lid of the storage box 61 may be locked separately.

Shelf Inventory Management Method

Figure 6:
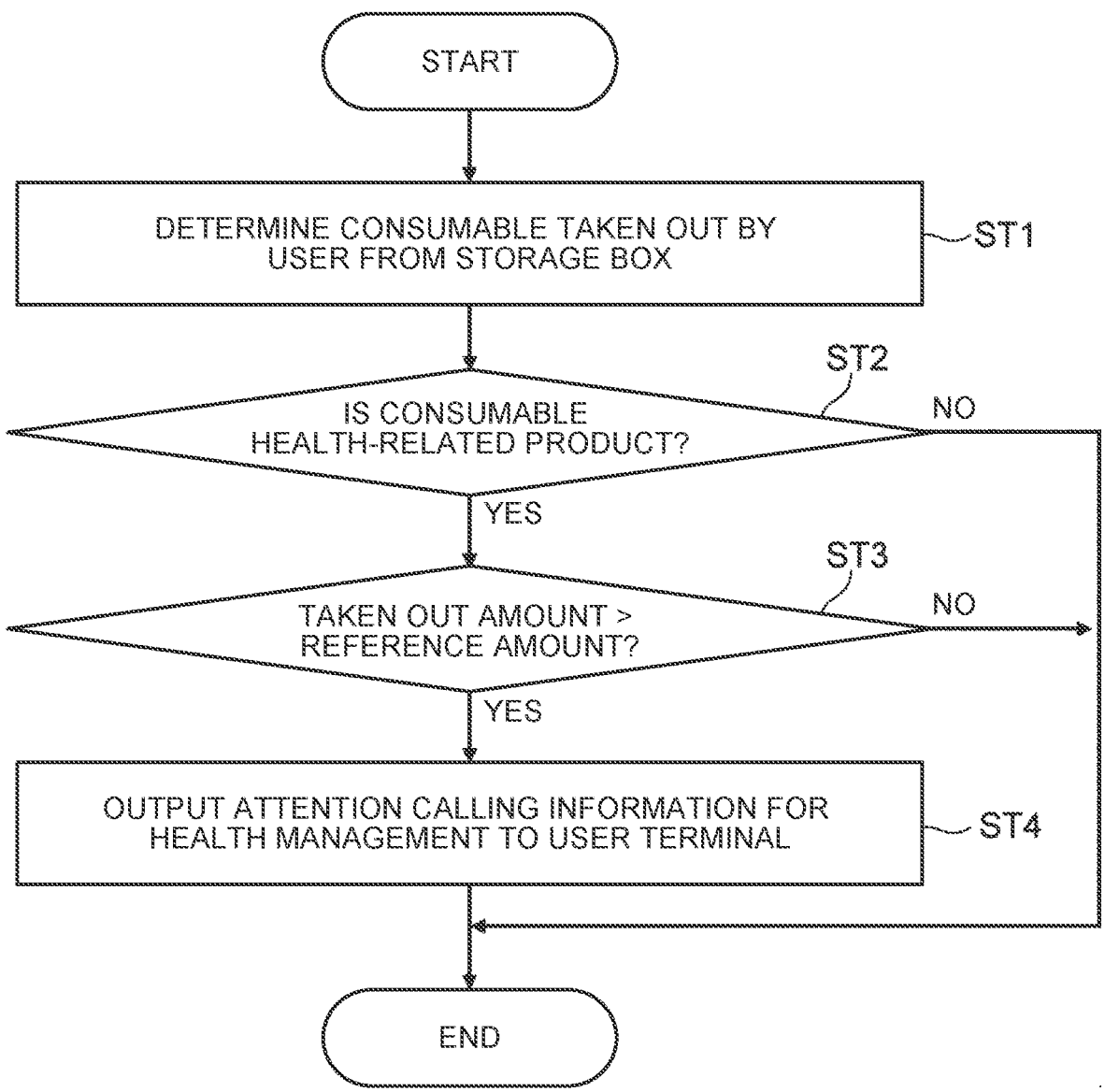
FIG. 6 is a flowchart showing a shelf inventory management method according to the first embodiment.

Next, a shelf inventory management method according to the first embodiment will be described with reference to FIG. 6. FIG. 6 is a flowchart showing the shelf inventory management method according to the first embodiment. As has been described with reference to FIG. 1, the management unit 100 stores the inventory information such as the identification information and the mass of each consumable stored in each storage box 61 to 63 on the shelf 50, and updates the inventory when the user takes out the consumables from the shelf 50. Further, in the shelf inventory management system according to the present embodiment, the management unit 100 stores the taken out amount of each health-related product stored in the shelf 50 for each registered user.

The series of processes shown in FIG. 6 is a process performed when the user takes out the consumable from the shelf 50 and before the management unit 100 updates the inventory. First, as shown in FIG. 6, the management unit 100 determines the consumable taken out by the user from any of the storage boxes 61 to 63 of the shelf 50, based on the mass change detected by the mass sensors MS1 to MS3 (step ST1).

Next, it is determined whether the consumable taken out is a health-related product (step ST2). When the consumable taken out is not a health-related product (step ST2: NO), the management unit 100 updates the inventory and ends the inventory management operation. Specifically, the consumable is deleted from the inventory of any of the storage boxes 61 to 63 from which the consumable has been taken out. On the other hand, when the consumable taken out is a health-related product (step ST2: YES), it is determined whether the taken out amount of the health-related product for the user in a predetermined period exceeds the reference amount for health management (step ST3).

When the taken out amount does not exceed the above reference amount (step ST3: NO), the inventory is updated, the health-related product is added to the taken out amount of the health-related product for the user, and the inventory management operation is ended. On the other hand, when the taken out amount exceeds the above reference amount (step ST3: YES), the attention calling information for calling attention to health management is output to the user terminal 70 (step ST4), and the inventory management operation is ended.

For example, when the user returns the taken-out health-related product to the shelf 50 in response to the attention calling information for refraining from consuming the health-related product, the management unit 100 ends the inventory management operation without updating the inventory. On the other hand, when the user does not return the taken-out health-related product to the shelf 50, the management unit 100 updates the inventory, adds the health-related product to the taken out amount of the health-related product for the user, and ends the inventory management operation.

As described above, in the shelf inventory management method according to the present embodiment, when the user takes out the health-related product and the taken out amount of the health-related product in a predetermined period exceeds the reference amount for health management, the attention calling information for calling attention to health management is output to the user terminal 70. Therefore, it is possible to effectively suppress excessive intake of alcoholic beverages, cigarettes, confectionery, etc., which may be harmful to health due to excessive intake, for example.

In the examples described above, various control programs can be stored using various types of non-transitory computer-readable media and supplied to a computer. The non-transitory computer-readable media include various types of tangible storage media. Examples of the non-transitory computer-readable media include magnetic recording media (e.g. flexible disks, magnetic tapes, hard disk drives), magneto-optical recording media (e.g. magneto-optical disks), compact disc ROM (CD-ROM), compact disc recordable (CD-R), compact disc rewritable (CD-R/W), and semiconductor memory (e.g. mask ROM, programmable ROM (PROM), erasable PROM (EPROM), flash ROM, RAM). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiments, and can be appropriately modified without departing from the spirit.

What is claimed is:

1. A shelf inventory management system comprising:
   a shelf installed in a house;
   a sensor that detects that an article is taken out from the shelf;
   a management unit that manages an inventory status of the article stored in the shelf, based on a detection result of the sensor; and
   a terminal for notifying a user of information related to the article stored in the shelf,
   wherein:
     the management unit stores, for each user, a taken out amount of each health-related product stored in the shelf and a consumption amount of which affects health, and outputs the taken out amount of each health-related product to the terminal;
     when the user takes out the health-related product, the management unit outputs to the terminal question information inquiring about a person who actually consumes the health-related product that has been taken out;
     the shelf includes a plurality of storage boxes each of which is identified;
     the sensor includes: a first sensor provided for each row of the shelf to detect a mass change of the storage boxes, and a second sensor that detects that each of the storage boxes is pulled out from the shelf;
     when the user takes out the health-related product instead of the person who actually consumes the health-related product that has been taken out, the management unit is configured to increase the taken out amount of the health-related product that is stored for the person by the detected mass change; and
     when the user takes out the health-related product and the taken out amount of the health-related product in a predetermined period exceeds a reference amount for health management, the management unit outputs to the terminal attention calling information for calling attention to health management.

2. The shelf inventory management system according to claim 1, wherein:
   the shelf is provided with a lock mechanism for locking each of the storage boxes, and each of the storage boxes is locked while the article is stored and unlocked when the article is taken in and out; and
   the second sensor detects that each of the storage boxes has been unlocked.

3. The shelf inventory management system of claim 1, further comprising:
   a camera configured to capture an image of the user, and
   wherein the management unit is configured to recognize a user who has taken out the health-related produce from the shelf based on the image captured by the camera.

4. The shelf inventory management system of claim 1, further comprising:
   a plurality of readers,
   wherein each of the storage boxes includes identification information, and
   wherein the management system is configured to determine that a storage box is pulled out from the shelf by detection results of the readers.

5. The shelf inventory management system of claim 1, wherein each storage box comprises a pair of sliding protruding portions that slide along a corresponding pair of rails, and the locking mechanism is provided on the upper side of each pair of rails.

6. A shelf inventory management method for detecting by a sensor that an article stored in a shelf installed in a house is taken out from the shelf, and managing an inventory of the article stored in the shelf by using a computer based on a detection result of the sensor, the shelf inventory management method comprising:
   storing, for each user, a taken out amount of each health-related product stored in the shelf and a consumption amount of which affects health;
   outputting the taken out amount of each health-related product to a terminal for notifying a user of information related to the article stored in the shelf;
   when the user takes out the health-related product, outputting to the terminal question information inquiring about a person who actually consumes the health-related product that has been taken out;
   when the user takes out a health-related product instead of the person who actually consumes the health-related product that has been taken out, increasing the taken out amount of the health-related product that is stored for the person by a detected mass change; and
   outputting to the terminal an attention calling information for calling attention to health management, when the user takes out the health-related product and the taken out amount of the health-related product in a predetermined period exceeds a reference amount for health management;
   wherein:
     the shelf includes a plurality of storage boxes each of which is identified, and the sensor includes: a first sensor provided for each row of the shelf to detect the mass change of the storage boxes, and a second sensor that detects that each of the storage boxes is pulled out from the shelf.

7. The shelf inventory management method according to claim 6, wherein:

the shelf is provided with a lock mechanism for locking each of the storage boxes, and each of the storage boxes is locked while the article is stored and unlocked when the article is taken in and out; and the second sensor detects that each of the storage boxes has been unlocked.

8. A non-transitory storage medium storing instructions that are executable by a processor and that cause the processor to perform functions, the instructions being for detecting by a sensor that an article stored in a shelf installed in a house is taken out from the shelf, and managing an inventory of the article stored in the shelf by using the processor based on a detection result of the sensor, wherein the functions comprise:

storing, for each user, a taken out amount of each health-related product stored in the shelf and a consumption amount of which affects health;

outputting the taken out amount of each health-related product to a terminal for notifying a user of information related to the article stored in the shelf;

when the user takes out the health-related product, outputting to the terminal question information inquiring about a person who actually consumes the health-related product that has been taken out;

when the user takes out the health-related produce instead of the person who actually consumes the health-related product that has been taken out, increasing the taken out amount of the health-related product that is stored for the person by a detected mass change; and outputting to the terminal an attention calling information for calling attention to health management, when the user takes out the health-related product and the taken out amount of the health-related product in a predetermined period exceeds a reference amount for health management;

wherein:

the shelf includes a plurality of storage boxes each of which is identified, and the sensor includes: a first sensor provided for each row of the shelf to detect the mass change of the storage boxes, and a second sensor that detects that each of the storage boxes is pulled out from the shelf.

* * * * *